US011507242B2

(12) United States Patent
Mahdi (10) Patent No.: US 11,507,242 B2
(45) Date of Patent: *Nov. 22, 2022

(54) REDUNDANT RESISTIVE TOUCH PANEL (71) Applicant: American Panel Corporation, Alpharetta, GA (US)

(72) Inventor: Ken Mahdi, Alpharetta, GA (US)

(73) Assignee: Mercury Mission Systems, LLC, Andover, MA (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/915,367

(22) Filed: Jun. 29, 2020

(65) Prior Publication Data
US 2020/0326798 A1 Oct. 15, 2020

Related U.S. Application Data (63) Continuation of application No. 16/547,657, filed on Aug. 22, 2019, now Pat. No. 10,788,945, which is a continuation of application No. 14/876,382, filed on Oct. 6, 2015, now Pat. No. 10,558,314.

(51) Int. Cl.
*G06F 3/045* (2006.01)
*G06F 3/041* (2006.01)
*G06F 3/044* (2006.01)

(52) U.S. Cl.
CPC ............ *G06F 3/045* (2013.01); *G06F 3/0444* (2019.05); *G06F 3/04166* (2019.05); *G06F 2203/04107* (2013.01)

(58) Field of Classification Search
CPC .. G06F 3/0418; G06F 3/04166; G06F 3/0444; G06F 3/045; G06F 2203/04107
See application file for complete search history.

(56) References Cited

U.S. PATENT DOCUMENTS

| 6,088,069 | A | 7/2000 | Farlow |
| 6,842,672 | B1 | 1/2005 | Straub et al. |
| 9,141,329 | B1 | 9/2015 | Reicher et al. |
| 2004/0268037 | A1 | 12/2004 | Buchanan, Jr. et al. |
| 2005/0110765 | A1* | 5/2005 | Baeza ............ G06F 3/045 345/173 |
| 2006/0013967 | A1 | 1/2006 | Mikoshiba et al. |
| 2008/0122376 | A1* | 5/2008 | Lys ............ H05B 45/20 315/192 |
| 2008/0158468 | A1 | 7/2008 | Kim et al. |
| 2008/0204419 | A1 | 8/2008 | Grothe |
| 2008/0218492 | A1 | 9/2008 | Endo |
| 2008/0261057 | A1 | 10/2008 | Slobodin |

(Continued)

FOREIGN PATENT DOCUMENTS

GB 2510600 A 8/2014
WO 2014185599 A1 11/2014

*Primary Examiner* — Yaron Cohen
(74) *Attorney, Agent, or Firm* — Standley Law Group LLP; Jeffrey S. Standley; Adam J. Smith (57) ABSTRACT A resistive touch panel assembly is disclosed. An optical stack located within a housing includes an electronic display layer adapted to display an image and a resistive touch panel. A number of touch input receivers are placed adjacent to a first and second independently operable, grid sections which are located adjacent to one another in a seamless fashion. A number of input/output devices are in communication with the optical stack and extend through a channel comprising shielding.

20 Claims, 10 Drawing Sheets

(56) References Cited

U.S. PATENT DOCUMENTS

| | | |
|---|---|---|
| 2008/0291686 A1 | 11/2008 | Cull et al. |
| 2010/0039366 A1 | 2/2010 | Hardy |
| 2010/0060349 A1 | 3/2010 | Etter et al. |
| 2010/0156795 A1 | 6/2010 | Kim et al. |
| 2010/0271324 A1 | 10/2010 | Hayes |
| 2011/0050617 A1 | 3/2011 | Murphy et al. |
| 2011/0095999 A1* | 4/2011 | Hayton ................. G06F 1/1643 345/206 |
| 2012/0105774 A1* | 5/2012 | Fletcher ............... G02B 5/3016 349/98 |
| 2012/0173859 A1* | 7/2012 | Wang .................... G06F 9/4401 713/2 |
| 2013/0015906 A1 | 1/2013 | Yeh |
| 2013/0100037 A1* | 4/2013 | Mabie ................. G06F 3/04186 345/173 |
| 2013/0127790 A1 | 5/2013 | Wassvik |
| 2013/0154994 A1 | 6/2013 | Yang |
| 2013/0265282 A1 | 10/2013 | Nakagawa et al. |
| 2014/0002176 A1 | 1/2014 | Guard |
| 2014/0160365 A1 | 6/2014 | Kwong et al. |
| 2014/0218642 A1* | 8/2014 | Iwami ................... G06F 3/0446 174/250 |
| 2014/0320437 A1 | 10/2014 | Kang |
| 2015/0049041 A1 | 2/2015 | Yousefpor |
| 2015/0077370 A1 | 3/2015 | Kim et al. |
| 2015/0193074 A1 | 7/2015 | Cudak et al. |
| 2015/0379964 A1 | 12/2015 | Lee et al. |
| 2016/0300549 A1 | 10/2016 | Zhang |
| 2017/0083151 A1 | 3/2017 | Khazeni et al. |

\* cited by examiner

REDUNDANT RESISTIVE TOUCH PANEL

CROSS-REFERENCE TO RELATED APPLICATIONS

This application is a continuation of U.S. application Ser. No. 16/547,657 filed Aug. 22, 2019, which is a continuation of U.S. application Ser. No. 14/876,382 filed Oct. 6, 2015, the disclosures of each of which are hereby incorporated by reference as if fully restated.

TECHNICAL FIELD

Embodiments of the present invention generally relate to touch screen displays.

BACKGROUND AND SUMMARY OF THE INVENTION

Electronic touch panel displays are used in many commercial applications including ATMs, automobiles, informational displays, personal computers, cell phones, and the like. Such displays are advantageous as the content may be easily changed and the displays are interactive. In many applications having an electronic touch panel display is desirable, but in some applications the need for redundancy has slowed the use of such displays.

Examples of such applications include, but are not limited to, commercial aviation, space flight, and military applications, where redundancy measures are demanded to ensure continued performance of equipment in the event of a partial failure. In these and other applications there may also be visibility requirements to ensure performance under extreme environmental conditions. These may include ability to withstand high levels of solar loading and visibility in bright ambient conditions. Such stringent requirements are demanded because of the possible consequences of failure. Therefore, it is desirable to provide an electronic touch panel display meeting visibility requirements and having redundancy measures.

Finally, in these and other applications, electromagnetic interference (EMI) and EMC may become an issue as there are often multiple pieces of electronic equipment operating in close proximity. Each device may emit electromagnetic energy, which can cause EMI with the operation of the other unit that may result in interrupted performance. EMC is the ability for multiple devices to work in the same electromagnetic environment. Therefore, it is additionally desirable to provide the aforementioned electronic touch panel display also having EMC endurance capabilities that limit EMI.

Exemplary embodiments of the present invention may comprise an electronic display housed in a sealed gasket with a resistive touch panel having redundant sensors and input/output devices. The gasket may prevent the display from being compromised by harsh environmental conditions. The display may additionally be comprised of multiple layers adapted to withstand high solar loading and remain visible in high ambient sunlight environments, such as by use of an active matrix liquid crystal display (AMLCD). This display may provide one large, contiguous video image or may provide multiple, independent video images.

The touch panel may comprise circuitry configured to limit EMI and improve EMC. The assembly may additionally comprise shielding between layers of the display and in the channels associated with the display, which also limits EMI and improves EMC.

At least two seamless, adjoining grid sections and corresponding touch sensors capable of determining touch screen input are utilized, thus providing a seamless display and interaction experience when viewed and utilized. This also makes the touch panel redundant. For example, without limitation in the event of a failure of one of the grids or the corresponding sensors, the display may automatically shift to display images only on the portion of the display covered by the remaining operable grid/sensor. Further, at least two input/output devices are utilized to ensure that each portion of the display and touch panel can be driven independently from either input/output device. These two measures provide redundancy and preserve the operability of the display under partial failure.

The display may be made such that it is adapted to comply with military specifications for use in military applications, such as aviation.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 through FIG. 5 illustrates an exemplary embodiment of the present invention. An electronic display and touch screen assembly 10 (hereinafter the "assembly") is comprised of a touch panel 14 located immediately above and extending in parallel with an electronic display 16. In exemplary embodiments of the present invention the electronic display 16 is a normally black liquid crystal display (LCD), such as the AMLCD. Other electronic displays 16 such as plasma, Light Emitting Diode (LED), Cathode Ray Tube (CRT), and the like are contemplated. In exemplary embodiments of the present invention, the assembly 10 and related components, including but not limited to the electronic display 16, support 2560×1024 pixels resolution.

As will be explained in greater detail in subsequent figures, the touch panel 14 is a resistive touch panel. The touch panel 14 may be wet laminated to the electronic display 16 and a gasket 12 may be provided that frames the two layers and creates a seal between the touch panel 14 and the electronic display 16. Thereby protecting the assembly 10 from harsh environmental conditions and providing durability. Other known methods of joining the touch panel 14 and the electronic display 16 are contemplated. The assembly 10 may include a heating device (not shown) for the electronic display 16 that permits the assembly 10 to operate in extreme conditions such as cold weather environments. The touch panel 14 may be in electronic communication with the electronic display 16 by flexible circuit, or the like.

Figure 1:
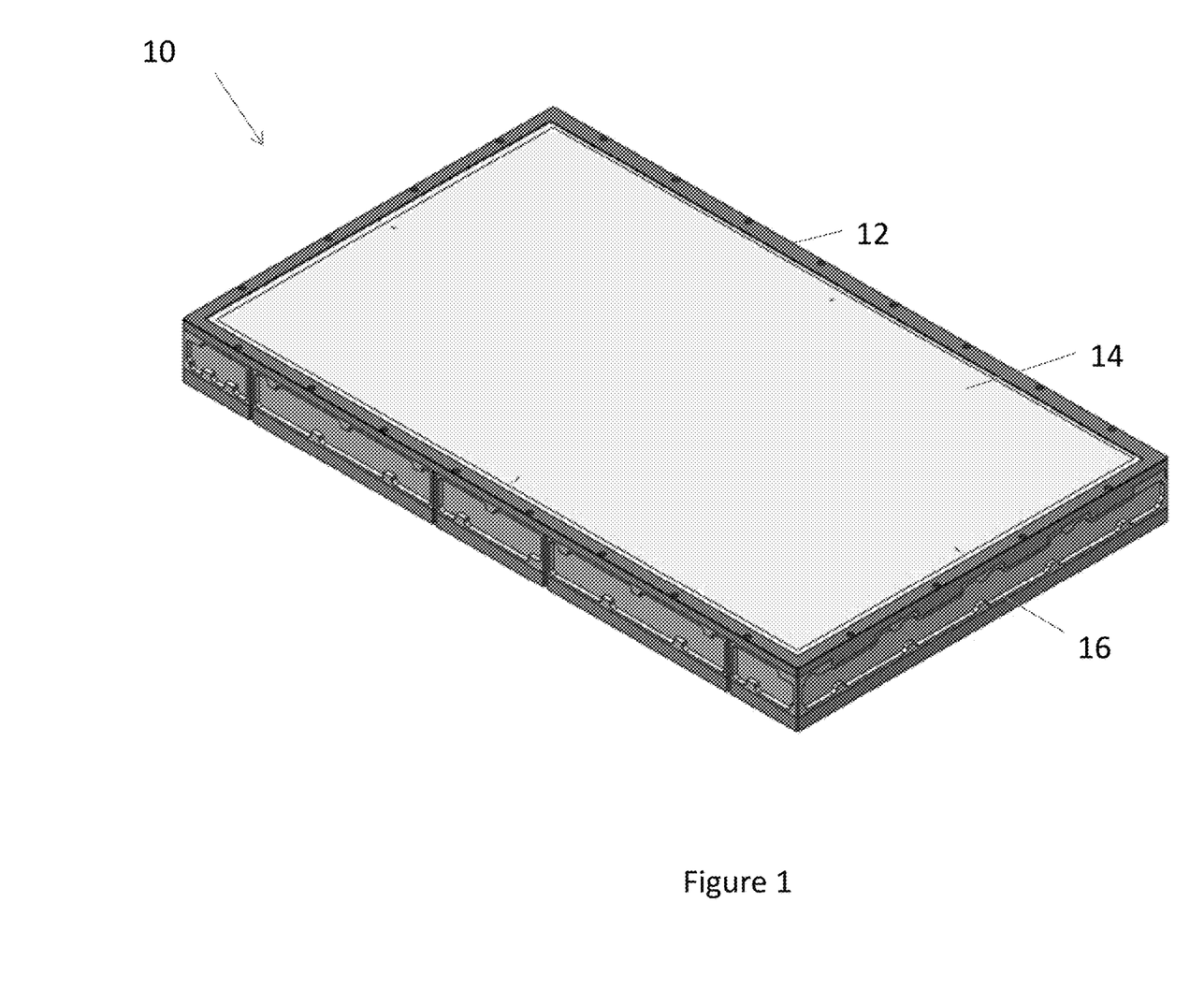
FIG. 1 is a top perspective view of an exemplary embodiment of the present invention.
Figure 2:
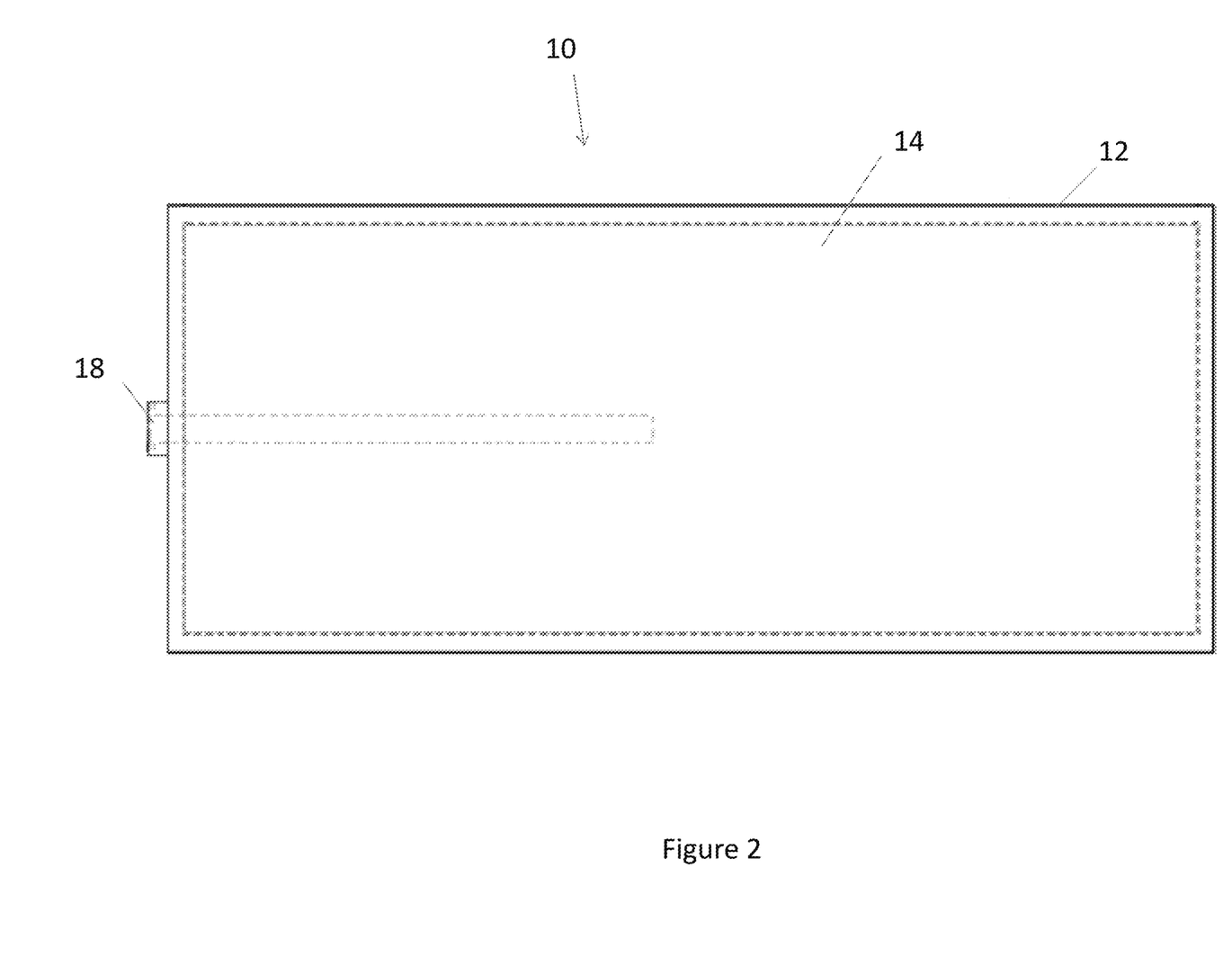
FIG. 2 is a top view of the device of FIG. 1.
Figure 3:
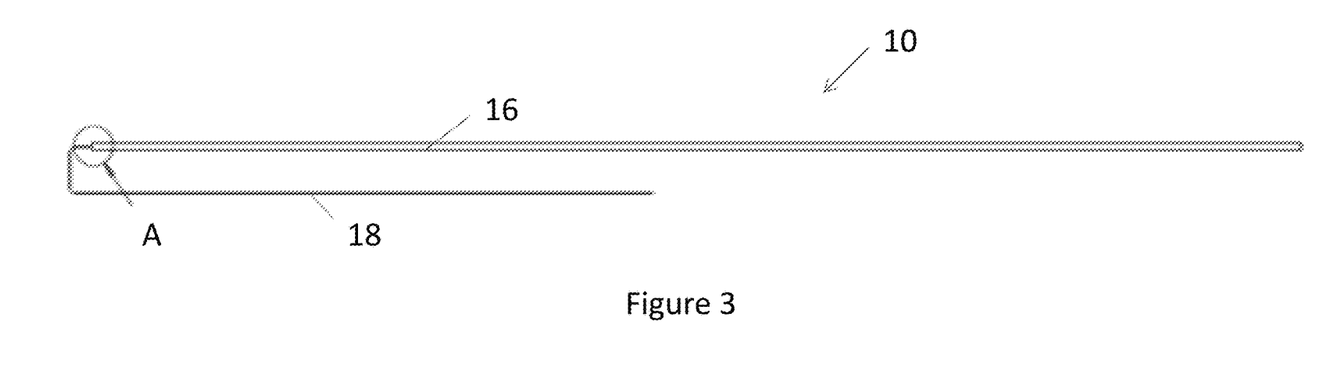
FIG. 3 is a side view of the device of FIG. 1, additionally indicating Detail A.
Figure 4:
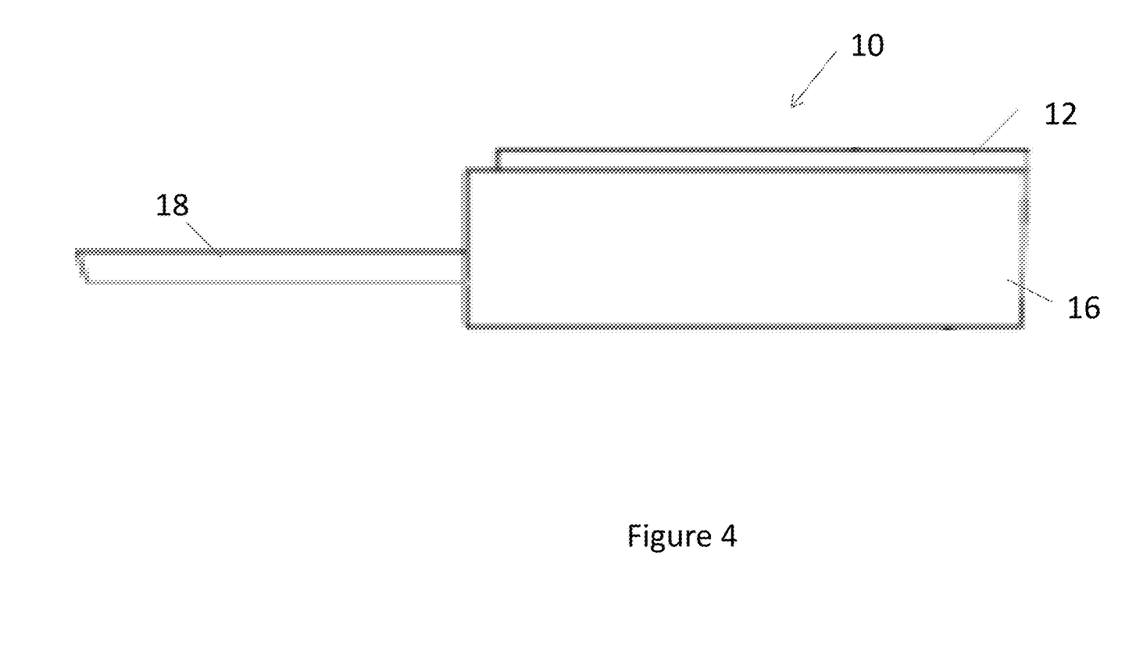
FIG. 4 is a detailed side view of Detail A of FIG. 3.

As best illustrated in FIG. 2 though FIG. 4, the assembly 10 may additionally comprise a channel 18. The channel 18 may extend from any side of the assembly 10 or from the back thereof. The channel 18 may be adapted to house a pair of independent input/output devices (not shown). When both input/output devices are operable, each may provide input/output signals for a respective portion of the electronic display 16. In exemplary embodiments of the present invention, each input/output device controls substantially half of the electronic display 16. This provides a redundancy measure. Should one input/output device fail, the remaining operable input/output device may provide input/output signals for the remaining portion of the electronic display 16 and thus maintain the operability of the assembly 10. In other exemplary embodiments of the present invention, each input/output device is capable of providing input/output for the entire electronic display 16.

Figure 5:
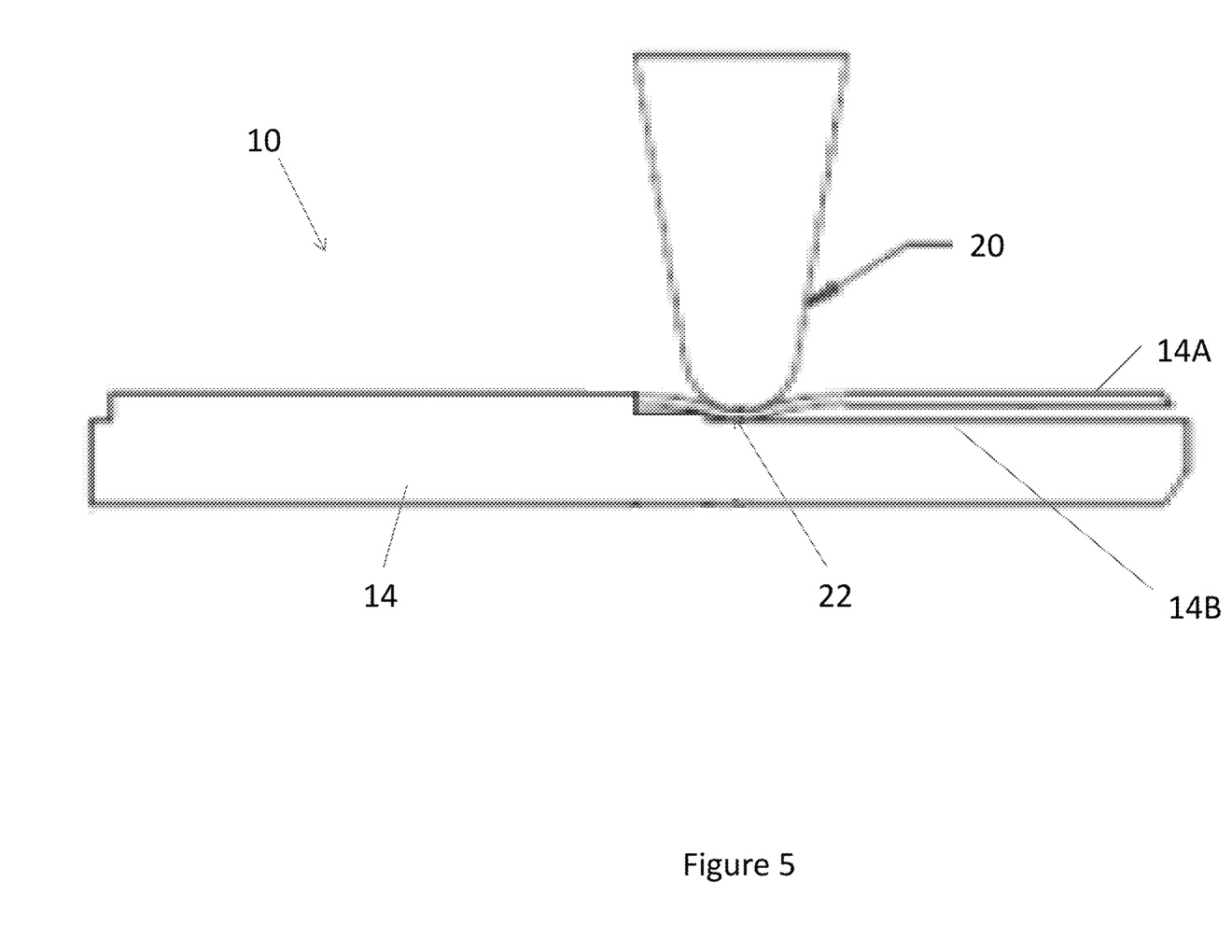
FIG. 5 is a detailed side view of the device of FIG. 1, illustrated with a stylus contacting the touch panel.

As best illustrated in FIG. 5 the touch panel 14 may be comprised of two spaced apart surfaces where a top circuit layer 14A is spaced apart from a bottom circuit layer 14B. The two layers extend over the same surface and are substantially parallel. They may be spaced apart by their placement within a housing, such as the gasket 12. Alternatively, the top 14A and bottom circuit layers 14B may be spaced apart by individual spacer elements (not shown). The top circuit layer 14A is sufficiently flexible such when contacted under sufficient force by a stylus 20, the top circuit layer 14A flexes to contact the bottom circuit layer 14B. Such exemplary operation is illustrated at a contact point 22. The top circuit layer 14A may be sufficiently elastic, however, to return to its original position after the force of the stylus 20 is removed. The stylus 20 may be a human finger, including a gloved hand, or an artificial device.

Figure 6:
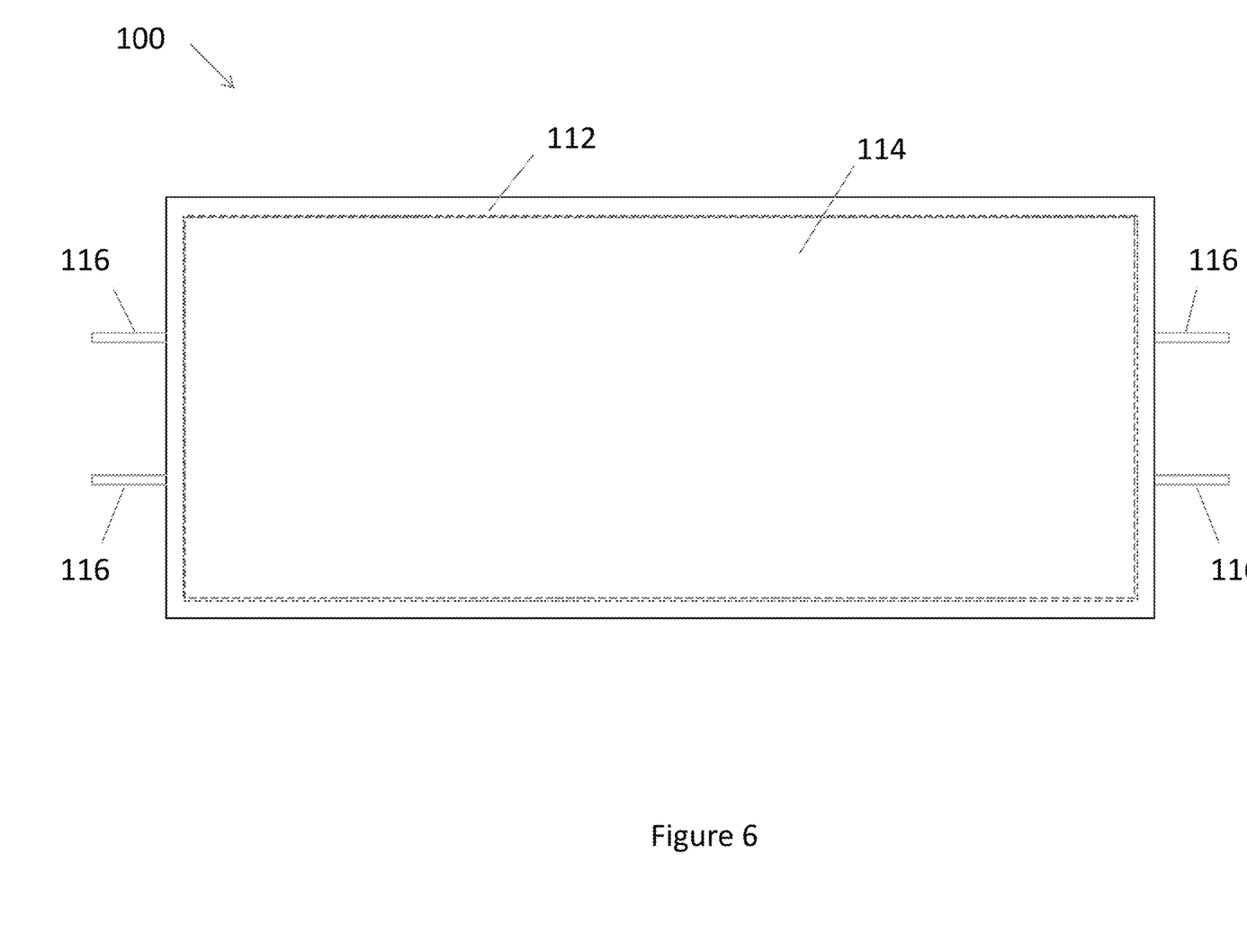
FIG. 6 is a top view of another exemplary embodiment of the present invention.
Figure 7:
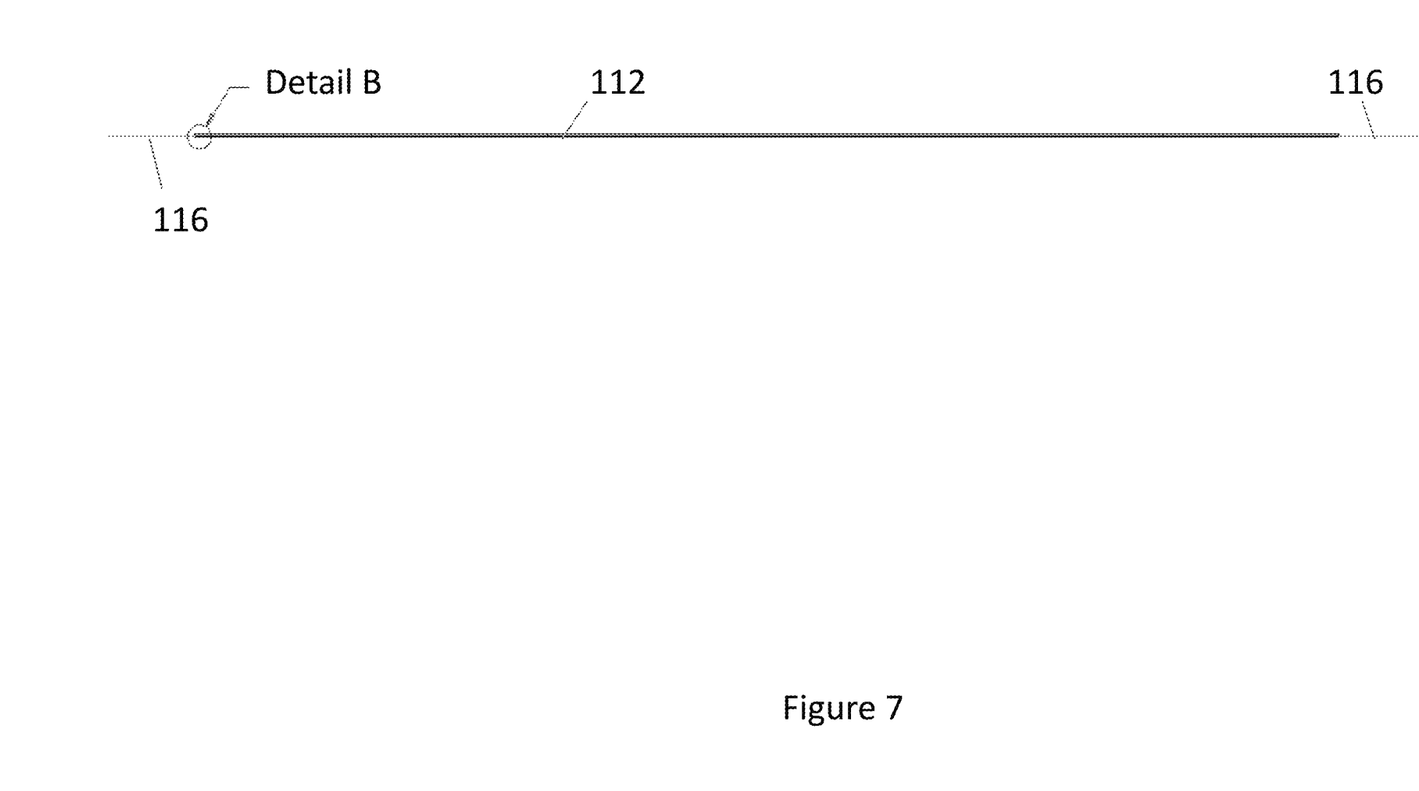
FIG. 7 is a side view of the device of FIG. 6, also indicating Detail B.
Figure 8:
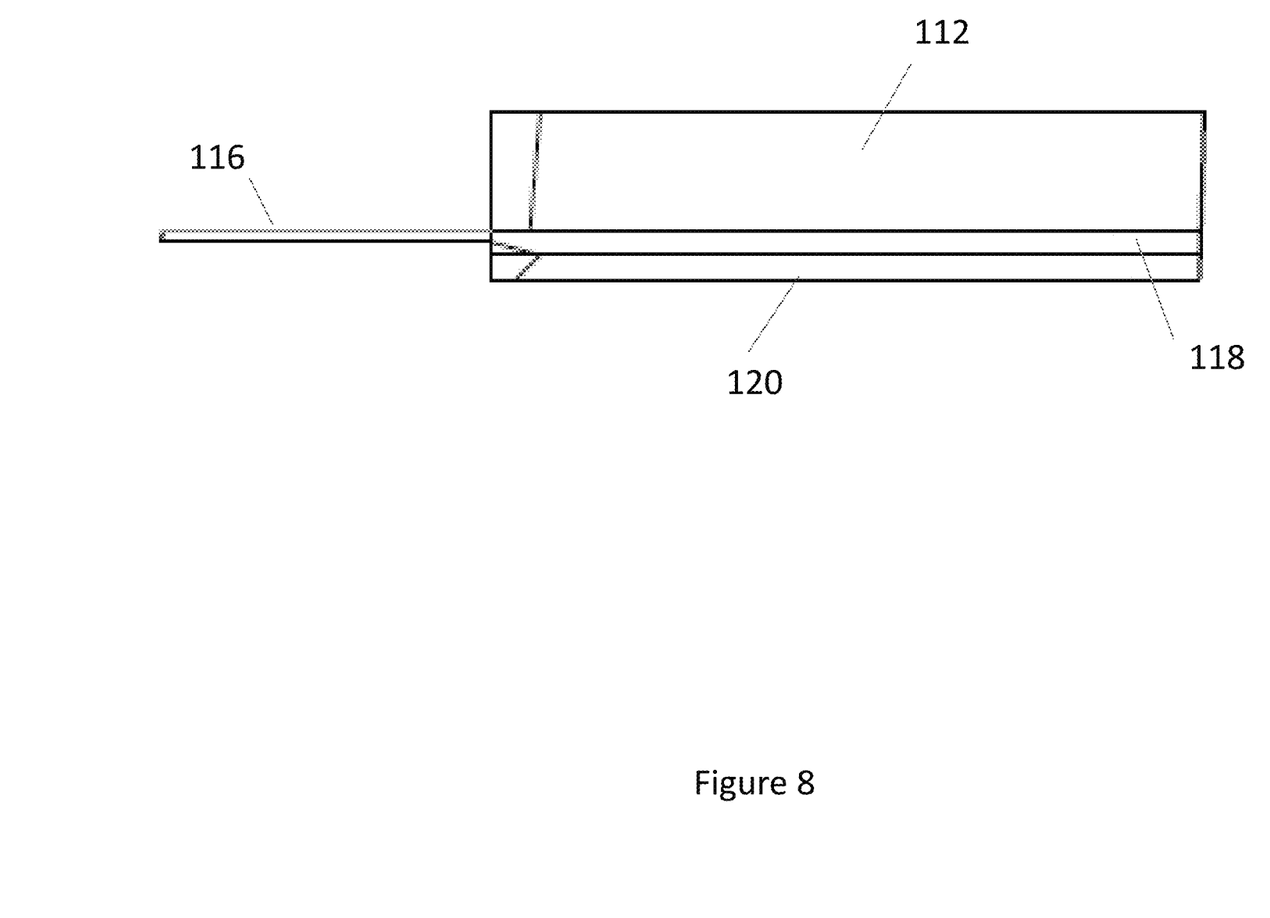
FIG. 8 is a detailed side view of Detail B as indicated in FIG. 7.

FIG. 6 through FIG. 8 illustrate another exemplary embodiment of an electronic display and touch screen assembly 100 (hereinafter the "assembly") in accordance with the present invention. The assembly 100 may be comprised of a touch panel 114 located immediately above and extending in parallel with an electronic display 112.

As will be explained in greater detail in subsequent figures, the touch panel 114 is a multi-touch resistive touch panel. The touch panel 114 may be comprised of a top circuit layer 118 and a bottom circuit layer 120. The top and bottom circuit layers 118 and 120 may be spaced apart or immediately adjacent to one another. Additionally, the top and bottom circuit layers 118 and 120 may be located spaced apart from or immediately adjacent to the electronic display 112. The touch panel 114 may be wet laminated to the electronic display 112 and a gasket 12 may be provided that frames the two layers and creates a seal between the touch panel 114 and the electronic display 112. Thereby protecting the assembly 100 from harsh environmental conditions and providing durability. Other known methods of joining the touch panel 114 and the electronic display 112 are contemplated. The assembly 100 may include a heating device (not shown) that permits the assembly 100 to operate in extreme conditions such as cold weather environments. The touch panel 114 may be in electronic communication with the electronic display 112 by flexible circuit, or the like.

The assembly 100 may additionally comprise a series of channels 116. The channels 116 may comprise shielding configured to reduce or eliminate EMI and promote EMC. In exemplary embodiment of the present invention, the assembly 100 comprises four channels 116, a pair of which each extend from the left and right sides of the assembly, respectively. However, any number of channels 116 extending from any part of the assembly 100 is contemplated. The channel 116 may be adapted to house a pair of independent input/output devices (not shown), each extending though one of the channels 116. When both input/output devices are operable, each may provide input/output signals for a respective portion of the assembly 100. In exemplary embodiments of the present invention, each input/output devices controls substantially half of the assembly 100. In such an embodiment, if one input/output device fails, the remaining operable input/output device may provide input/output signals for the remaining half the assembly 100 and thus maintain operability. However, in other exemplary embodiments of the present invention, each input/output device is capable of providing input/output for the entire assembly 100. This provides a redundancy measure. In such an embodiment, if one input/output device fails, the remaining operable input/output device may provide input/output signals for the assembly 100 and thus maintain operability.

In exemplary embodiments of the present invention, the assembly 100 and related components are configured to remain operable in atmospheric pressure conditions ranging from sea level to 55,000 feet altitude, including with a rate of change up to 120 feet per second. Similarly, the assembly 100 and related components are configured to withstand 95% humidity, temperature changes between 55 and 90 degrees Celsius (C) at a rate of 40 degrees C. per minute with a maximum operating temperature of −45 degrees C. to 71 degrees C. and prolonged storage temperatures of −55 degrees C. to over 90 degrees C. All coatings and materials in the assembly 100 may be configured to withstand, without degradation, commonly used solvents such as water, acetone, lacquer thinner, optical adhesive, and the like. Similarly, all coatings and materials in the assembly 100 may be configured to withstand, without degradation, commonly used cleaners such as ammonia, detergent, soap, and the like.

Figure 9:
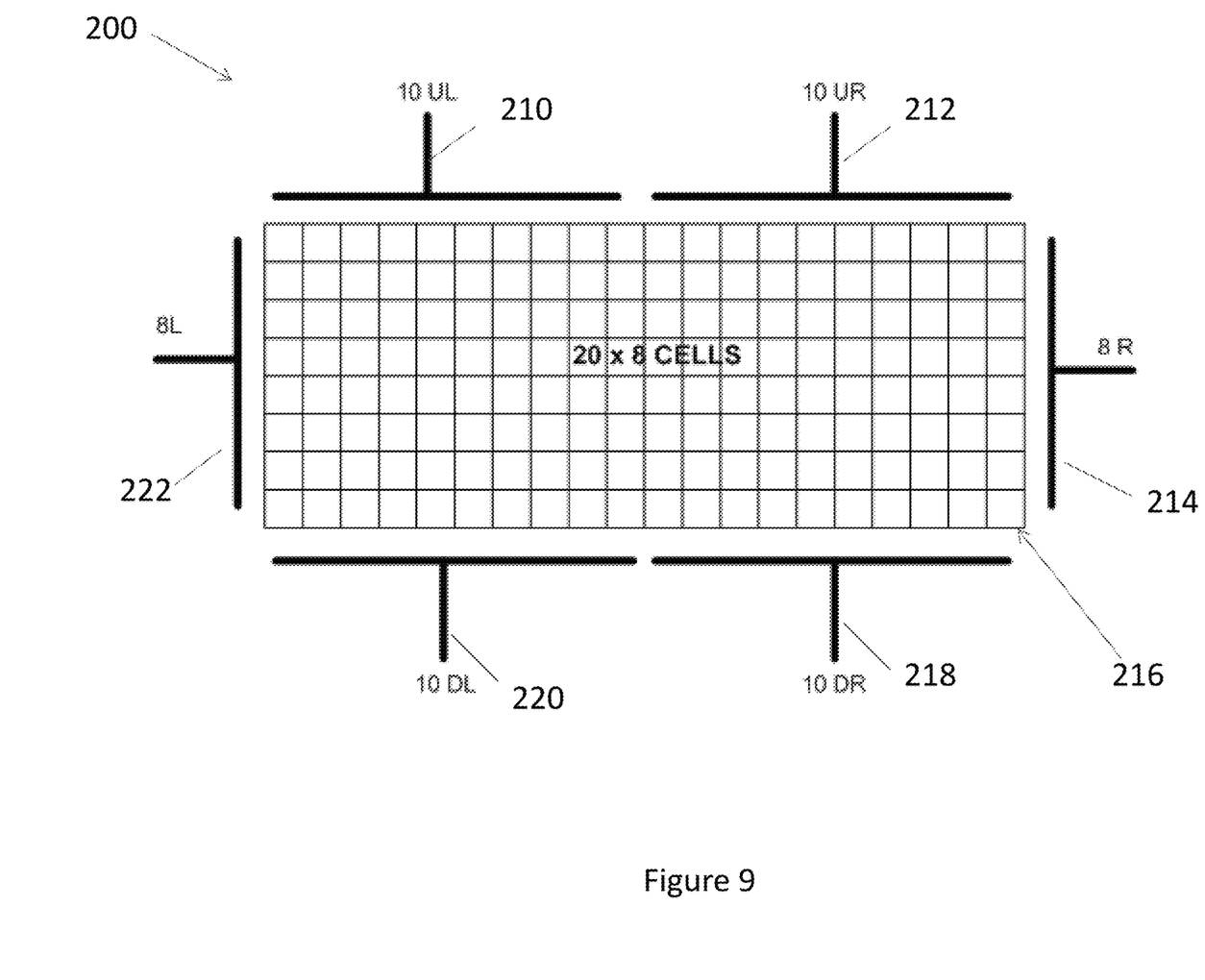
FIG. 9 is a top view of an exemplary embodiment of the touch panel in accordance the present invention.

FIG. 9 is a front view of an exemplary touch panel 200 in accordance with the present invention. The touch panel 200 may comprise a grid 216 of vertically and horizontally extending electrodes. In exemplary embodiments of the present invention, the grid 216 may be comprised of two adjoining, seamless 8×10 sections formed by the vertically and horizontally extending electrodes, effectively providing an 8×20 grid and defining a first and a second grid section. Each of the first and second grid sections may be operated by an independent input/output device. In exemplary embodiments of the present invention, each of the first and the second grid sections corresponds to substantially half of the touch panel 200. It is notable, however, that any size grid 216 having any number of vertically and horizontally extending electrodes and corresponding grid sections are contemplated. The grid 216 may be surrounded by a series of receivers 210, 212, 214, 218, 220, and 222. The pair of receivers 214 and 222 may extend along the right and left edges of the grid 216, respectively. The pair receivers 210 and 212 may extend along the left and the right portions of the upper edge of the grid 216, respectively. Finally, the pair of receivers 220 and 218 may extend along the left and the right portions of the lower edge of the grid 216, respectively.

In an exemplary embodiment of the present invention, the receivers 210, 220, and 222 may be placed to receive signals generated by touching the first grid section. Likewise, the receivers 212, 214, and 218 may be placed to receive signals generated by touching the second grid section. The grid 216 is sized to cover the entirety of the electronic display 16. The vertically extending receivers 222 and 214 may be configured to receive input regarding the vertical (Y) position of the input. Similarly, the horizontally extending receivers 210, 212, 218, and 220 may be configured to receive input regarding the horizontal (X) position of the input.

In exemplary embodiments of the present invention, each of the vertically extending receivers 222 and 214 may be capable of receiving input signals regarding the Y position of the input from both the first and second grid section. The horizontally extending receivers 210 and 220 may be capable of receiving input signals regarding the X position of the input from the first grid section. Similarly, the horizontally extending receivers 212 and 218 may be capable of receiving input signals regarding the X position of the input from the second grid section.

The grid 216 and the receivers 210, 212, 214, 218, 220, and 222 may be configured to respond to a stylus, a human finger, or a gloved hand. The grid 216 and the receivers 210, 212, 214, 218, 220, and 222 may be configured to respond to an activation pressure of under 0.8N and may allow for multiple touch inputs to be measured simultaneously.

The first and second grid sections and corresponding receivers provides a redundancy measure. When both the first and the second grid sections are operable, the entire touch panel 200 may be utilized. Should one of the first or the second grid sections or the corresponding receivers be rendered inoperable, the remaining operable grid section may accept touch input for the portion of the grid 212 that it controls. For example, if the receiver 210, 222, and/or 220 should fail, the image that was being shown on the electronic display 112 may be shifted onto just the portion of the electronic display 112 corresponding to the remaining operable first or second grid sections such that the assembly 100 remains fully functional, albeit over a smaller area. In other exemplary embodiments, in such circumstances half of the assembly 100 may remain operable and the image may not be shifted.

It is notable that while the touch panel 200 may be described in terms of operating with a particular embodiment described herein, it is contemplated that the touch panel 200 may be utilized with any of the embodiments described herein.

As will be discussed in greater detail in subsequent figures, the touch panel 200 may be utilized in conjunction with a bottom glass layer 320 of an exemplary display panel 300 illustrated in FIG. 10, and each line of the touch panel 200 grid 216 may comprise an exemplary circuit 400, such as the one illustrated in FIG. 11.

In one exemplary embodiment of the present invention, the touch panel active area may be 506.88 mm×202.75 mm and the activation force needed may be in the range of 0.05N-0.8N and may provide a minimum of two point multi-touch, and may have an operating life of over 1 million hits. In other embodiments of the present invention all of the above dimensions and values may change to the desire of the user or manufacturer.

Figure 10:
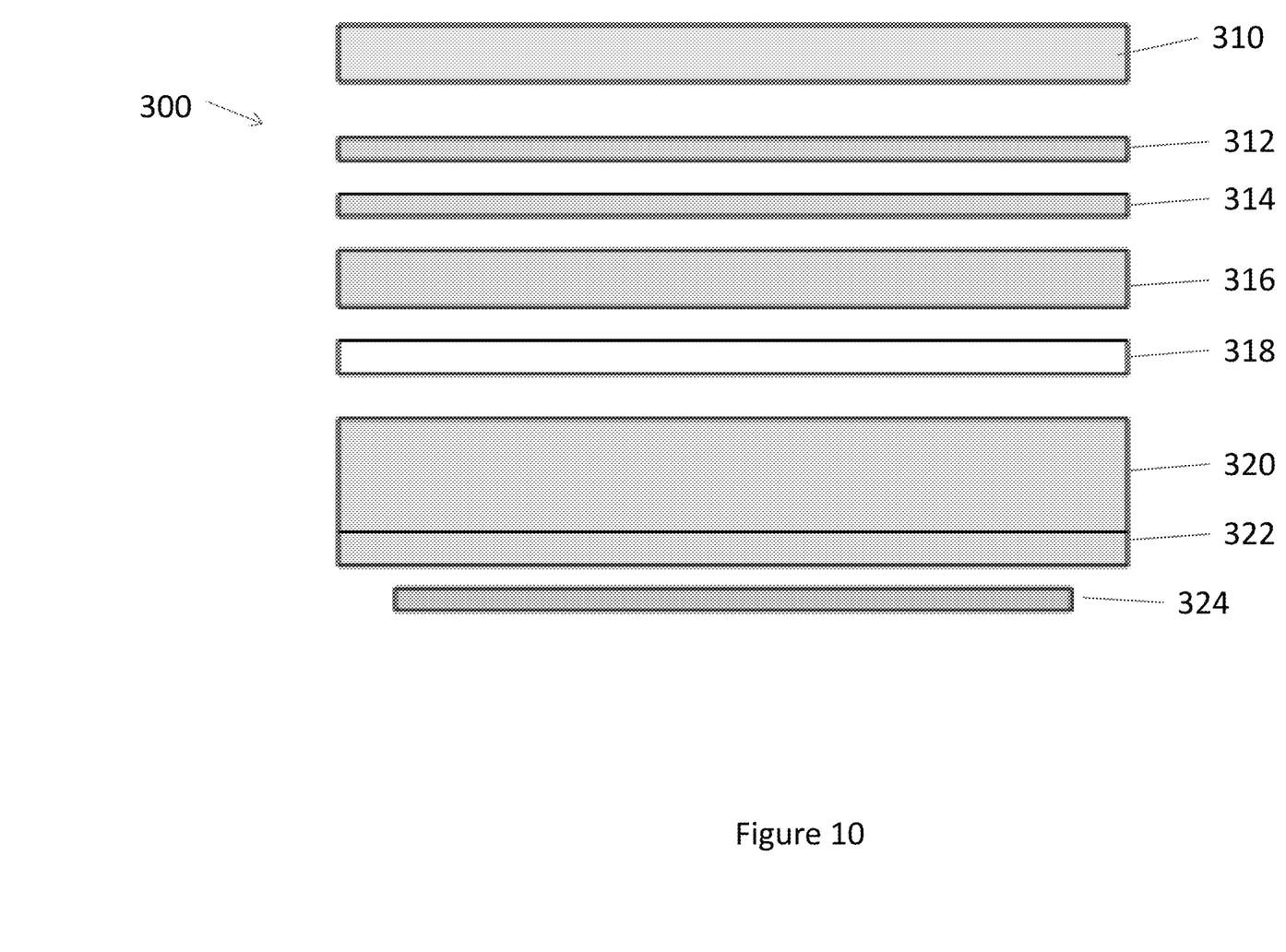
FIG. 10 is an exploded detailed side sectional view of an exemplary embodiment of a display panel in accordance with the present invention.

FIG. 10 is an exploded detailed side sectional view of the exemplary display panel 300 in accordance with the present invention, such for use with the electronic display 16. A cover glass 310 may form the top layer of the display panel 300. The cover glass 310 may comprise an anti-smudge, anti-reflective coating. A linear polarizer 312 followed by a quarter wave retarder 314 may be located below the cover glass 310 and above a top glass 316. The quarter wave retarder 314 may be configured to withstand high temperatures. An optically clear adhesive (OCA) layer 318 may be placed between the top glass 316 and the bottom glass 320.

The bottom glass 320 may be located below the top glass 316 but above an indium tin oxide (ITO) layer 322. In exemplary embodiments of the present invention, the touch panel 200 will be located in the bottom glass 320 layer. The ITO layer 322 may be located immediately below and be affixed to the bottom glass 320. The ITO layer 322 may act as an EMI shielding layer, thus promoting EMC. In exemplary embodiments of the present invention, the ITO layer 322 may extend beyond the bottom glass 320 by 3 mm on all sides. Finally, a final quarter wave retarder 324 may form the bottom layer of the display 300. The final quarter wave retarder 324 may have a smaller area than the previous layers, which may all have substantially the same surface area. Such a configuration permits the display panel 300 to be visible in high ambient light conditions and operable under high levels of solar loading. In exemplary embodiments of the present invention the display panel 300, the assembly 100, and other related components shall be configured to withstand prolonged exposure to solar radiation with a normal flux of 260 BTU/ft$^2$ at sea level atmospheric pressure and 55 degrees C.

Each of these layers may extend in parallel with the other layers. Each of these layers may also be spaced apart from one another and be of various thicknesses. In exemplary embodiments of the present invention, the layers may be immediately adjacent to, secured to, or integrally formed with one another. In exemplary embodiments of the present invention, the cover glass 310 may be a 0.15 mm micro sheet. In other embodiments, the cover glass 310 may be 0.5 mm thick. The top glass 316 may also be 0.15 mm thick, while the bottom glass may be 1.1 mm thick. The ITO layer 322 may be 3 mm thick. While these thicknesses are exemplary, they are not intended to be limiting, any functional thicknesses are contemplated. It is also notable that adhesive layers may be placed between any of the layers of the display panel 300.

It is notable that while exemplary display panel 300 may be described in terms of operating with a particular embodiment described herein, it is contemplated that the display panel 300 may be utilized with any of the embodiments described herein.

Figure 11:
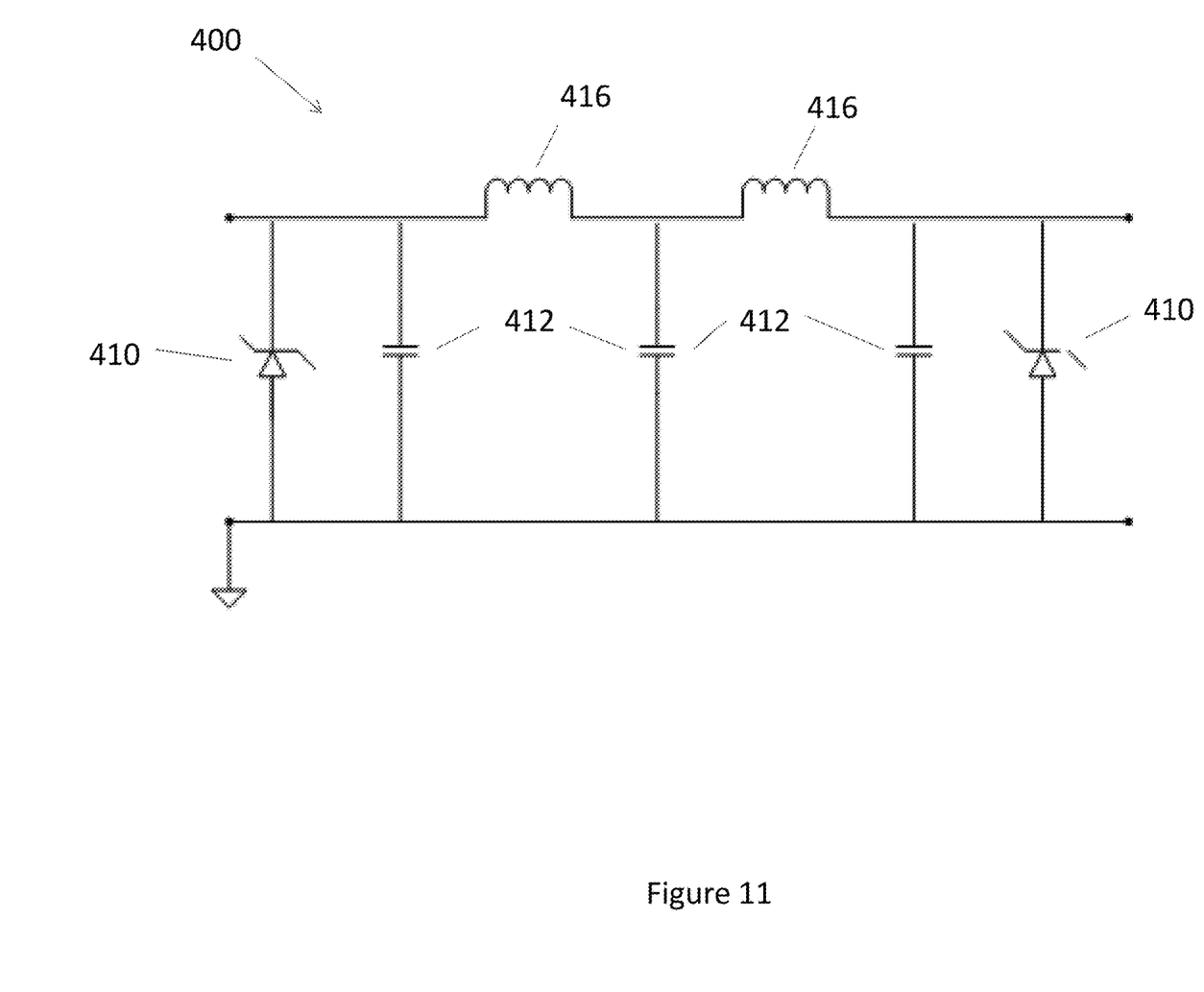
FIG. 11 is a plan view of an exemplary circuit in accordance with the present invention.

FIG. 11 illustrates an exemplary circuit 400 in accordance with the present invention. The exemplary circuit 400 is configured to minimize EMI and maximize EMC. Each line of the grid 216 of the touch panel 220 may be comprised of the circuit 400. Therefore, it is contemplated that any number of the circuits 400 may be utilized in communication with one another.

The circuit 400 may be used with the assembly 10 or the assembly 100 in conjunction with the touch panels 14 and 114, respectively. It is notable that while exemplary circuit 400 may be described in terms of operating with a particular embodiment described herein, it is contemplated that the circuit 400 may be utilized with any of the embodiments described herein.

The circuit 400 may comprise a pair of zener diodes 410 in parallel with and located on either side of a series of capacitors 412. An inductor 416 may be placed in series between each capacitor 412. In exemplary embodiments of the present invention, three capacitors 412 are placed in parallel, and an inductor 416 is placed in series between each of said capacitors 412. Other arrangements are contemplated.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A touch panel assembly for reducing electromagnetic interference, said assembly comprising: a housing adapted to be secured within an instrument panel of a vehicle; an optical stack located within said housing, having an electronic display layer adapted to display an image; a resistive touch panel comprising first and second independently operable, seamless grid sections and a plurality of touch input receivers placed adjacent to said first and second independently operable, seamless grid sections; an electromagnetically shielded channel extending from within said housing to outside of said housing; and a plurality of input/output devices in communication with said optical stack, and extending through the electromagnetically shielded channel.

2. The assembly of claim 1 wherein:
said resistive touch panel comprises a matrix of electronic circuits; and
each of the electronic circuits in the matrix comprises:
 a first terminal;
 a second terminal;
 a third terminal;
 a plurality of zener diodes, each coupled between said first terminal and said third terminal;
 a plurality of capacitors, each coupled between said first terminal and said third terminal, wherein each of said capacitors is coupled in parallel with each of said zener diodes;
 a first inductor coupled in series between said first terminal and said second terminal;
 a second inductor coupled in series between said first terminal and said second terminal, wherein said second inductor is coupled in series with said first inductor; and
 a second capacitor coupled between said first terminal and said third terminal, wherein said second capacitor is coupled in series with said first and second inductors.

3. The assembly of claim 1 wherein:
the electronic display layer comprises liquid crystals.

4. The assembly of claim 1 further comprising:
a controller having executable software instructions, which when executed, configure the controller to:
 display the image across substantially an entirety of the electronic display layer;
 monitor for failure of one of said first and second grid sections; and
 upon failure of one of said first and second grid sections, display the image on only an operable one of said first and said second grid sections.

5. The assembly of claim 1 further comprising:
a controller having executable software instructions, which when executed, configure the controller to:
 monitor for failure of one of said input/output devices; and
 upon failure of one of said input/output devices, automatically switch signaling to an operable one of said input/output devices.

6. The assembly of claim 1 wherein:
at least two of said input/output devices are in electrical connection with said first grid section and at least two others of said input/output devices are in electrical connection with said second grid section.

7. The assembly of claim 6 further comprising:
a controller having executable software instructions, which when executed, configure the controller to:
 monitor for failure of any of said input/output devices; and
 upon failure of an input/output device, automatically switch to an operable one of said input/output devices.

8. The assembly of claim 1 wherein:
the optical stack further comprises a cover layer located above a linear polarizer, which is located above a top glass, located above a bottom layer, located above an indium tin oxide layer.

9. The assembly of claim 8 wherein:
said housing and said cover layer form a substantially watertight assembly.

10. The assembly of claim 1 wherein:
said electronic display layer is wet laminated to said resistive touch panel.

11. The assembly of claim 1 further comprising:
a heating device within the assembly, configured to provide heat to the assembly.

12. The assembly of claim 1 wherein:
said touch panel electronically senses activation pressures between 0.05N and 0.8N.

13. The assembly of claim 1 wherein:
said touch panel is configured to substantially instantaneously respond to multiple simultaneous touches.

14. The assembly of claim 1 wherein:
each of said grid sections comprise a matrix of electrical circuits having a pair of zener diodes located in parallel with a plurality of capacitors, and an inductor in series with each capacitor.

15. The assembly of claim 14 wherein:
said number of capacitors is three and the number of inductors is three.

16. A touch panel assembly for reducing electromagnetic interference in a commercial, military, or private vehicle, said touch panel assembly comprising: a housing adapted to be secured within an instrument cluster of said commercial, military, or private vehicle; an optical stack located within said housing and comprising: a cover layer; a linear polarizer located below the cover layer; a quarter wave retarder located below the linear polarizer; a top layer located below the quarter wave retarder; a liquid crystal electronic display layer adapted to display an image; a resistive touch panel comprising first and second independently operable, seamless grid sections and a number of touch input receivers placed adjacent to said first and second independently operable, seamless grid sections; a bottom layer located below the resistive touch panel; an indium tin oxide layer located below the bottom layer; and a quarter wave retarder located below the indium tin oxide layer; a number of input/output devices in communication with said touch panel; a channel comprising electromagnetic shielding and extending from within the housing to an area outside of said housing, wherein said input/output devices extend through said channel; a controller having executable software instructions, which when executed, configure the controller to: display the image across substantially an entirety of the electronic display layer; monitor for failure of one of said grid sections; and upon failure of one of said grid sections, display the image on only a portion of the electronic display corresponding with an operable one of said grid sections.

17. The assembly of claim 16 wherein:
each of the grid sections include electrical circuits and each of the electrical circuits comprise a pair of zener diodes located in parallel with capacitors, and an inductor placed in series with each capacitor.

18. A touch panel assembly for reducing electromagnetic interference in a commercial, military, or private vehicle, said touch panel assembly comprising: a housing adapted to be secured within an instrument cluster of the commercial, military, or private vehicle; an optical stack located within said housing and comprising: a cover glass; a linear polarizer located below the cover glass; a Quarter wave retarder located below the linear polarizer; a top glass located below the Quarter wave retarder; a liquid crystal layer adapted to display an image; a resistive touch panel having first and second independently operable, seamless grid sections and a series of touch input receivers for said first and second independently operable, seamless grid sections; a bottom glass located below the resistive touch panel; an indium tin oxide layer located below the bottom glass; and a quarter wave retarder located below the indium tin oxide layer; a number of input/output devices in communication with said touch panel; and a channel extending from within said housing to outside of said housing, said channel comprising electromagnetic shielding, and said input/output devices extending through said channel; wherein each of the grid sections comprise electrical circuits; wherein each of the electrical circuits includes a pair of zener diodes located in parallel with, and on either side of, a number of capacitors.

19. The assembly of claim 18 further comprising:
a controller having executable software instructions, which when executed, configure the controller to:
display the image across an entirety of the electronic display layer;
monitor for failure of one of said grid sections; and
upon failure of one of said grid sections, display the image on only an operable one of said grid sections.

20. A touch panel assembly reducing electromagnetic interference, said assembly comprising: a housing adapted to be secured within an instrument cluster of a vehicle; an optical stack located within said housing and comprising: an electronic display subassembly comprising an electronic display layer adapted to display an image; and a resistive touch panel layer comprising first and second grid sections and a number of touch input receivers placed adjacent to said first and second grid sections, wherein said first and second grid sections are located adjacent to one another to present a seamless appearance to a user and are independently operable, wherein said resistive touch panel layer is laminated to a layer of said electronic display subassembly; a number of input/output devices in electrical connection with said optical stack; and at least one electromagnetically shielded channel extending from within said housing to an area outside of said housing, wherein said input/output devices extend through said at least one channel.

* * * * *